Dec. 21, 1943.     A. J. FETTIG     2,337,091
CALCULATING MACHINE
Filed Dec. 28, 1937     10 Sheets—Sheet 1

INVENTOR
Arthur J. Fettig
BY Davis, Lindsey, Smith & Shonts
ATTORNEYS

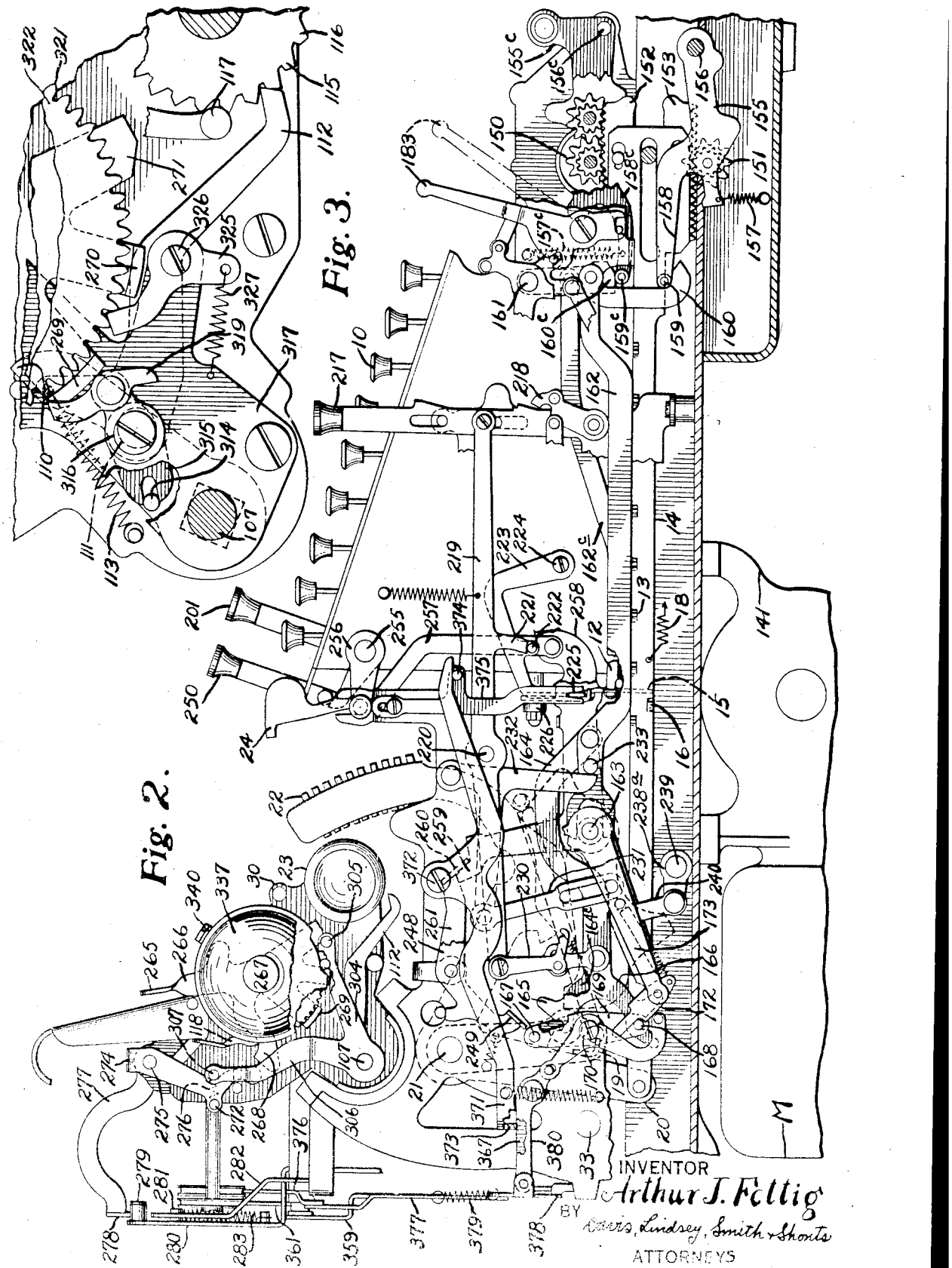

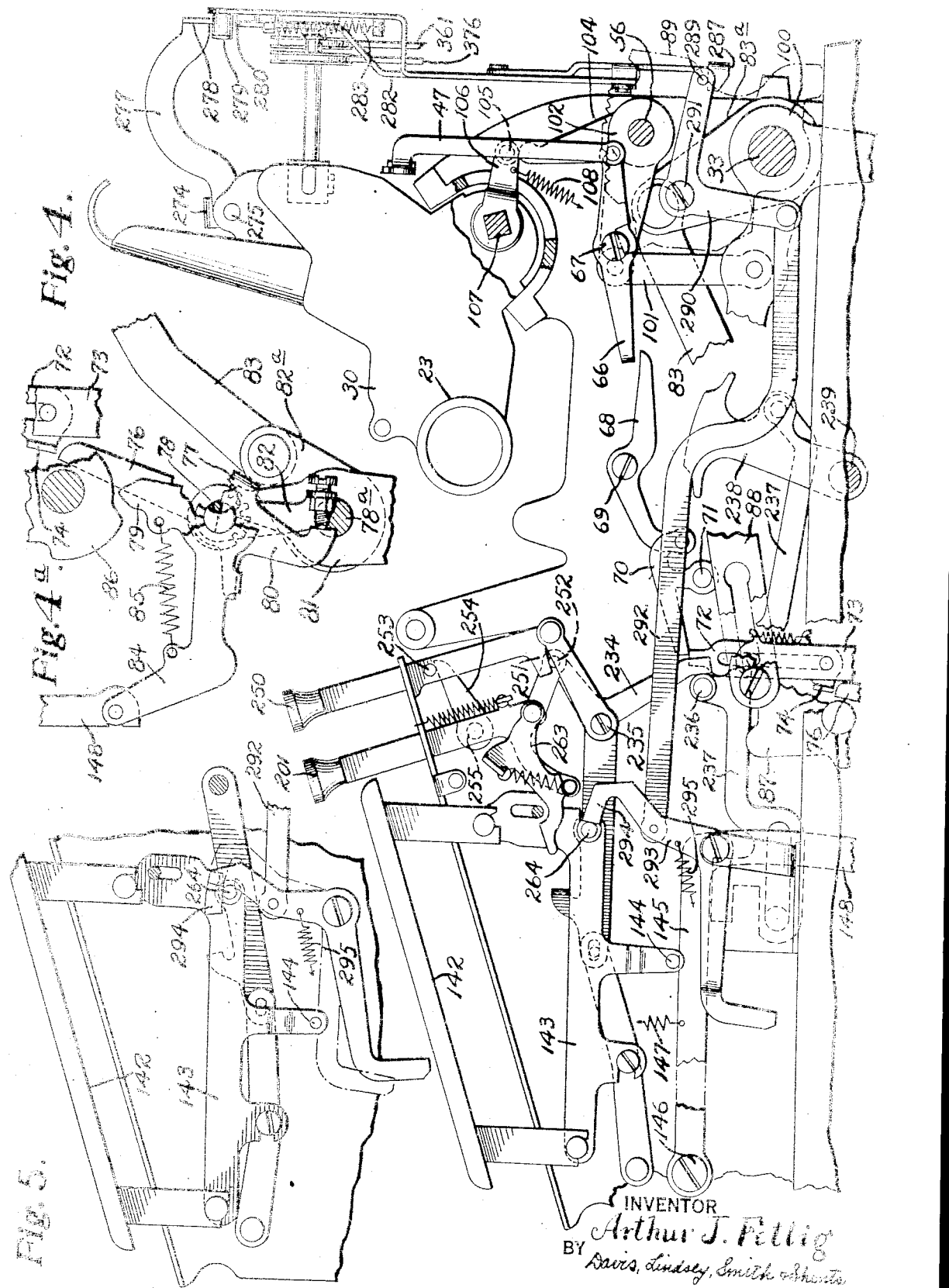

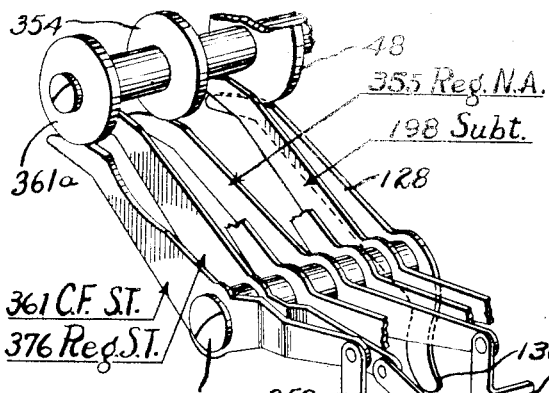
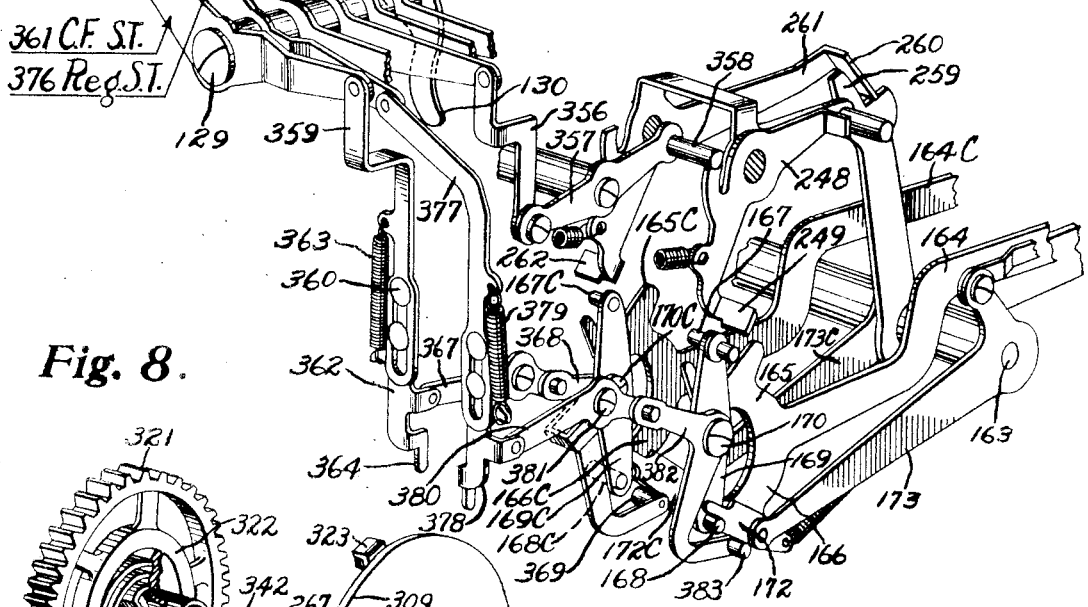
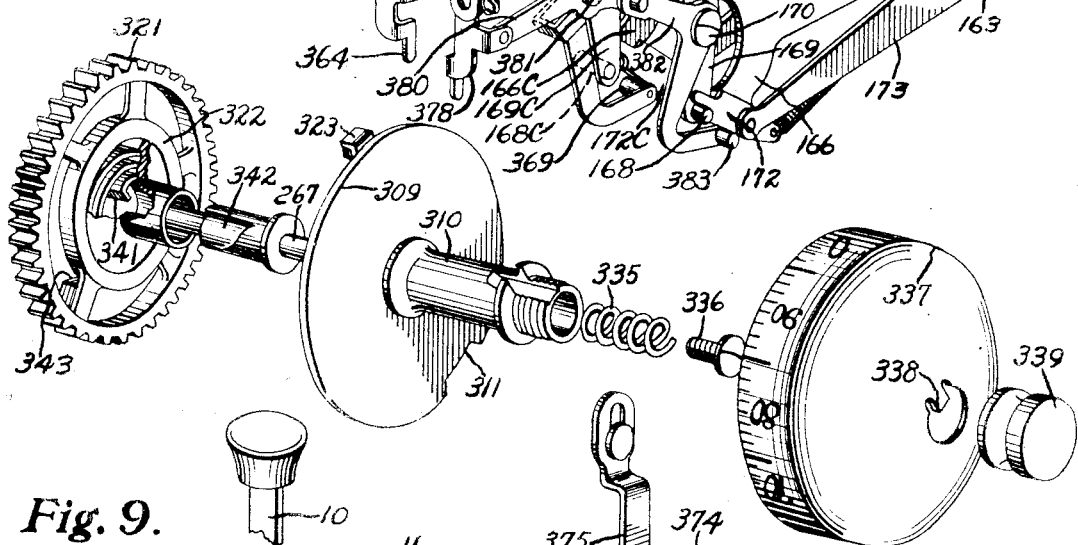
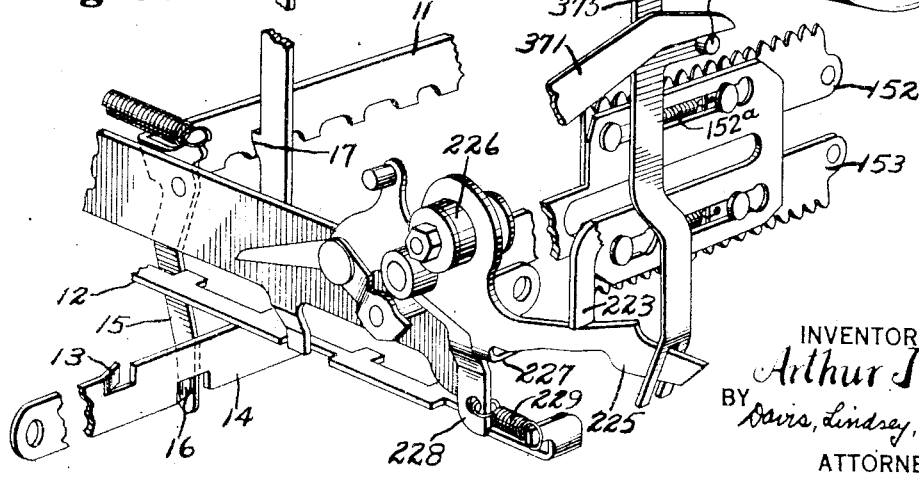

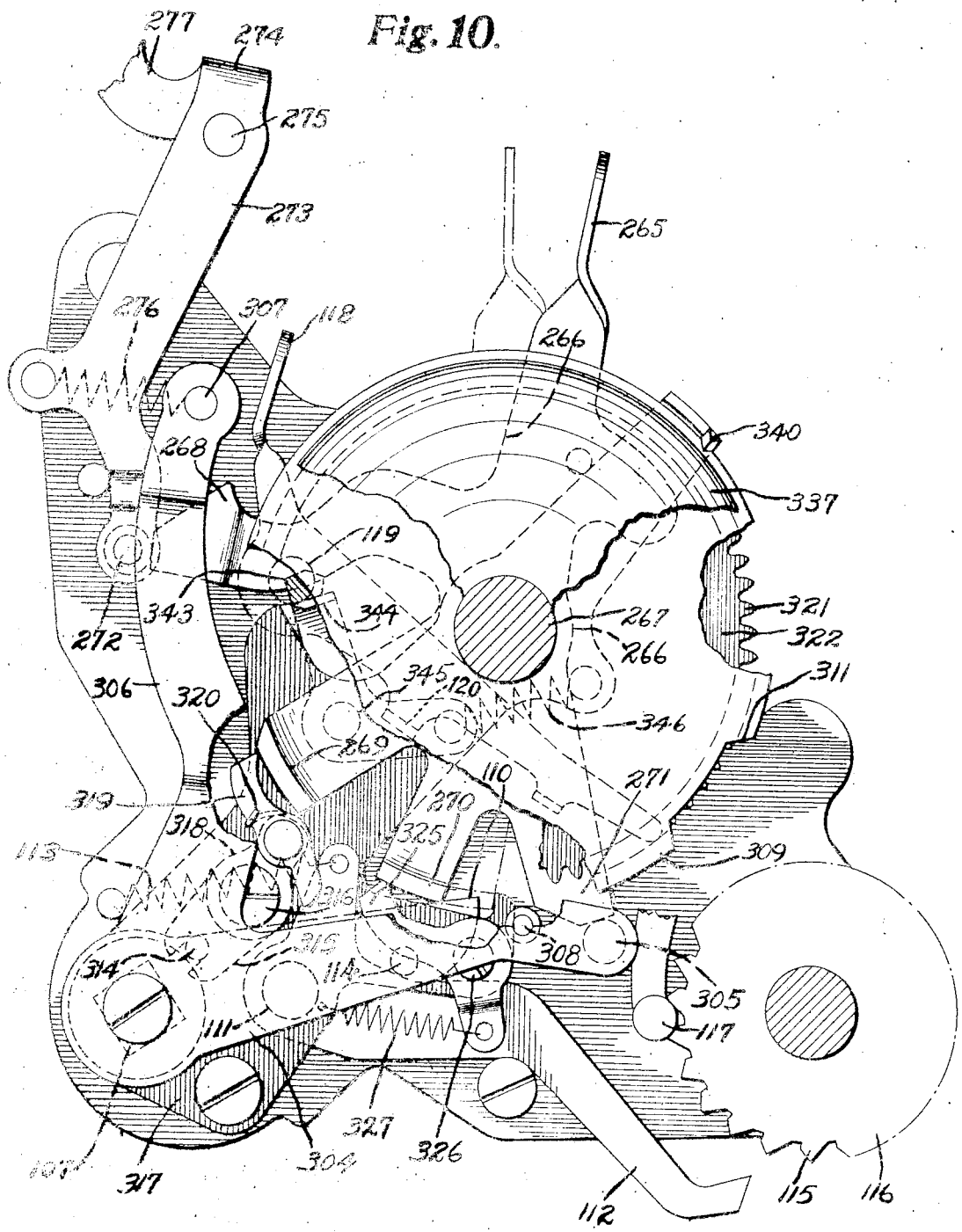

Dec. 21, 1943.  A. J. FETTIG  2,337,091
CALCULATING MACHINE
Filed Dec. 28, 1937   10 Sheets-Sheet 8

INVENTOR
Arthur J. Fettig
BY Davis, Lindsey, Smith & Shouts
ATTORNEYS

Dec. 21, 1943.    A. J. FETTIG    2,337,081
CALCULATING MACHINE
Filed Dec. 28, 1937    10 Sheets-Sheet 9

INVENTOR
Arthur J. Fettig
BY Davis, Lindsey, Smith & Shorts
ATTORNEYS

Fig. 14.

Set Pre-Set Counter Here and Depress Motor Bar to Start Automatic Cycle.

| | 1 | 2 | 3 |
|---|---|---|---|
| | C O N T R A C T | | 140.00 |
| DEC | 12.00 | | 128.00 |
| JAN | 12.00 | | 116.00 |
| FEB | 12.00 | | 104.00 |
| MAR | 12.00 | | 92.00 |
| APR | 12.00 | Automatic Cycle Spacing Strokes | 80.00 |
| MAY | 12.00 | | 68.00 |
| JUN | 12.00 | | 56.00 |
| JUL | 12.00 | | 44.00 |
| AUG | 12.00 | | 32.00 |
| SEP | 12.00 | | 20.00 |
| OCT | 12.00 | | 8.00 |
| NOV | 8.00 | .00 | |

Payment Amount Entered, Motor Bar Depressed, Carriage Tabulates, Carriage Control of Subtract in Crossfooter 150, Add in Register 151.

Automatic Cycle. Carriage Controlled Sub-Total Register 151, Subtract Crossfooter 150.

Add Register Total Key Depressed, Carriage Control of Subtract in Crossfooter.

Crossfooter Total Key Disables Subtract, Crossfooter Total Key Depressed.

Motor Bar Depressed for Spacing Stroke to Tabulate Carriage into Column No. 3, Add Register Non Add, Crossfooter Restored to Add.

Crossfooter Total Key Depressed, (Closed Account).

Contract amount Entered, Motor Bar Depressed, Added in Crossfooter 150, Platen Line Spaced, Carriage Tabulate Automatic Cycle, Carriage Control of Sub-Total Crossfooter, Non Add Register.

Crossfooter Sub-Total Key Depressed, Sub-Total Crossfooter.

Carriage Arrives Here for Next Contract.

INVENTOR
Arthur J. Fettig
BY Davis, Lindsey, Smith & Shonts
ATTORNEYS

Patented Dec. 21, 1943

2,337,091

UNITED STATES PATENT OFFICE 2,337,091

CALCULATING MACHINE

Arthur J. Fettig, Detroit, Mich., assignor to Burroughs Adding Machine Company, Detroit, Mich., a corporation of Michigan Application December 28, 1937, Serial No. 182,056

6 Claims. (Cl. 235—60)

This invention relates to a calculating machine. It is concerned principally with certain improvements for enabling such a machine to be employed to automatically set up the payments on a deferred payment plan or contract.

When an article is purchased on the deferred payment plan it is desirable to prepare a statement showing in advance the date and amount of each payment, together with the amount of the unpaid balance opposite each payment. This advance statement serves as a record both for the seller and purchaser during the life of the contract so that either party may know at all times when the next payment is due and what the balance will be after the payment is made. Provision is sometimes made on this statement for receipting or indicating each individual payment.

The general object of the invention is to provide an improved calculating machine.

A more particular object is to provide a machine in which, after the amount of the contract and the amount of the payment is entered, and the machine set in operation it will automatically cycle so as to print and tabulate the amount of each payment and the unpaid balances opposite the amount of each payment, all of which is entirely automatic until the balance is reduced to the last payment, at which time the machine cycling is automatically stopped and the operator then completes the last item by manual operation of the machine. The automatic cycling of the machine in this manner permits a much faster operation than the hand operated method and it also relieves the operator for other duties in connection with preparing the contract.

Other objects and advantages of the invention will appear from the following specification and drawings.

An embodiment of the invention is illustrated in which,

Fig. 2 is a left side elevation of a machine with the invention applied thereto;

Fig. 3 is a detail side elevation of a portion of the mechanism which is pre-set to obtain predetermined operations;

Fig. 4 is a partial right side elevation showing the motor control bars and the automatic cycling mechanism the parts being shown in normal position;

Figure 6:
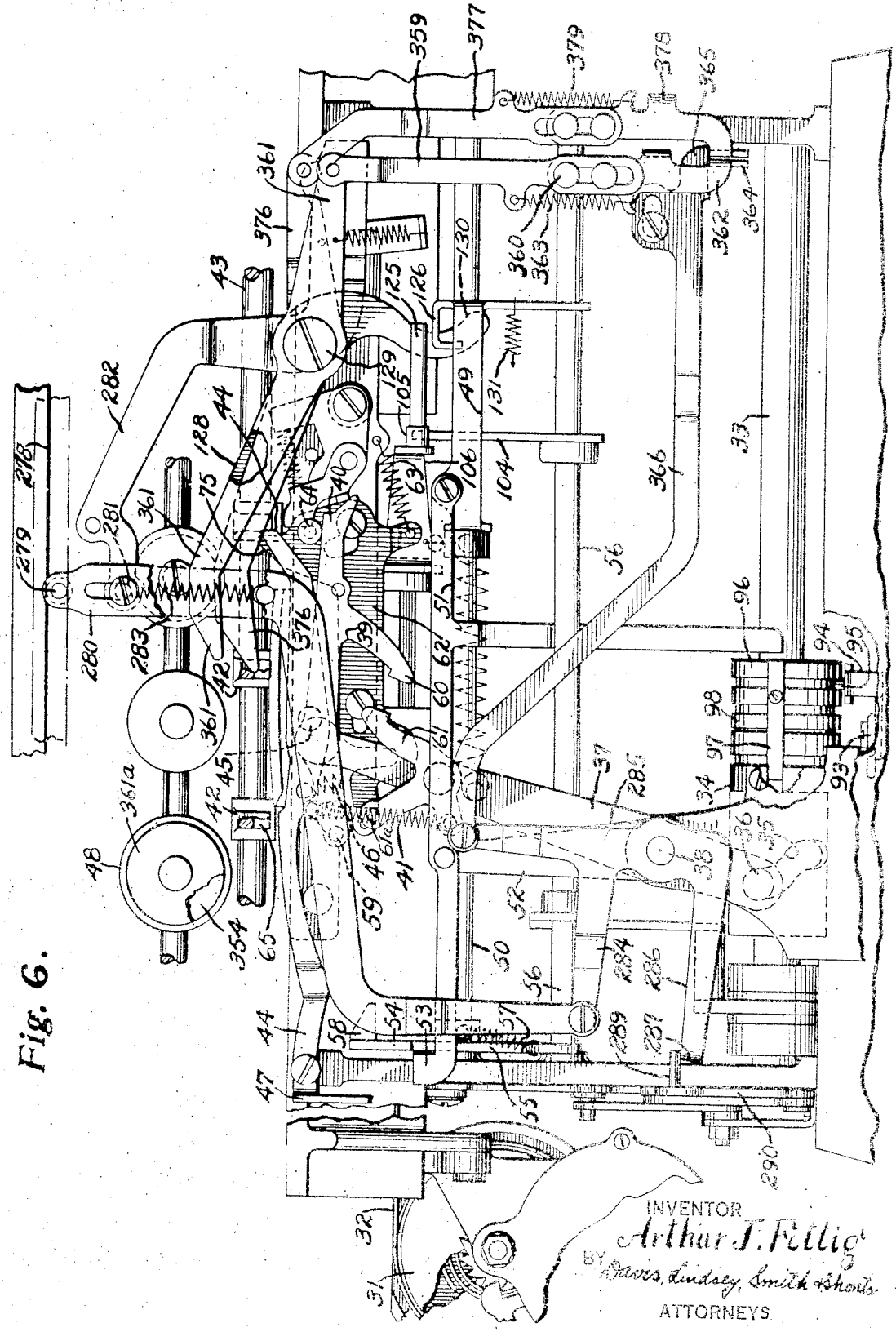
Figure 11:
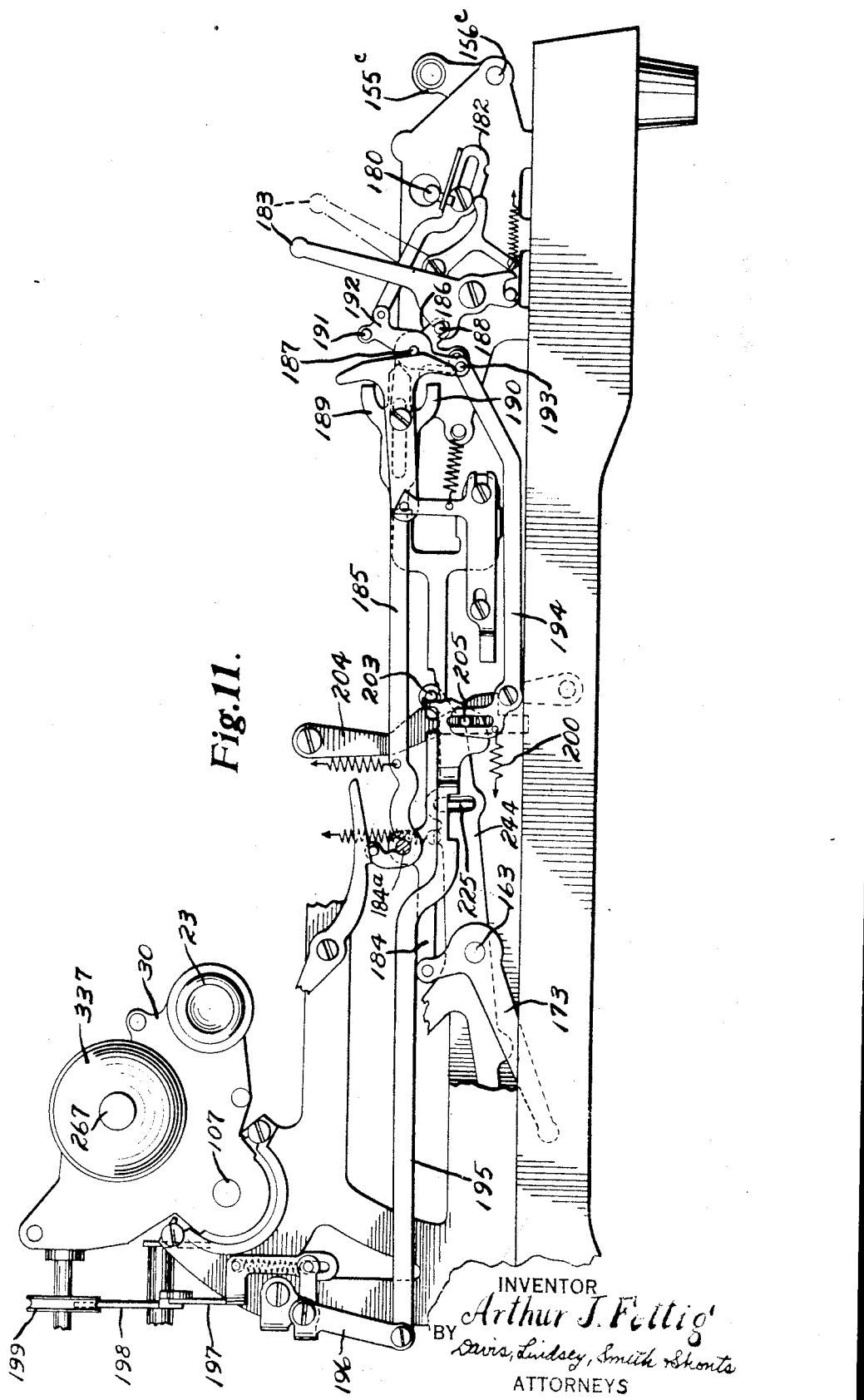
Figure 12:
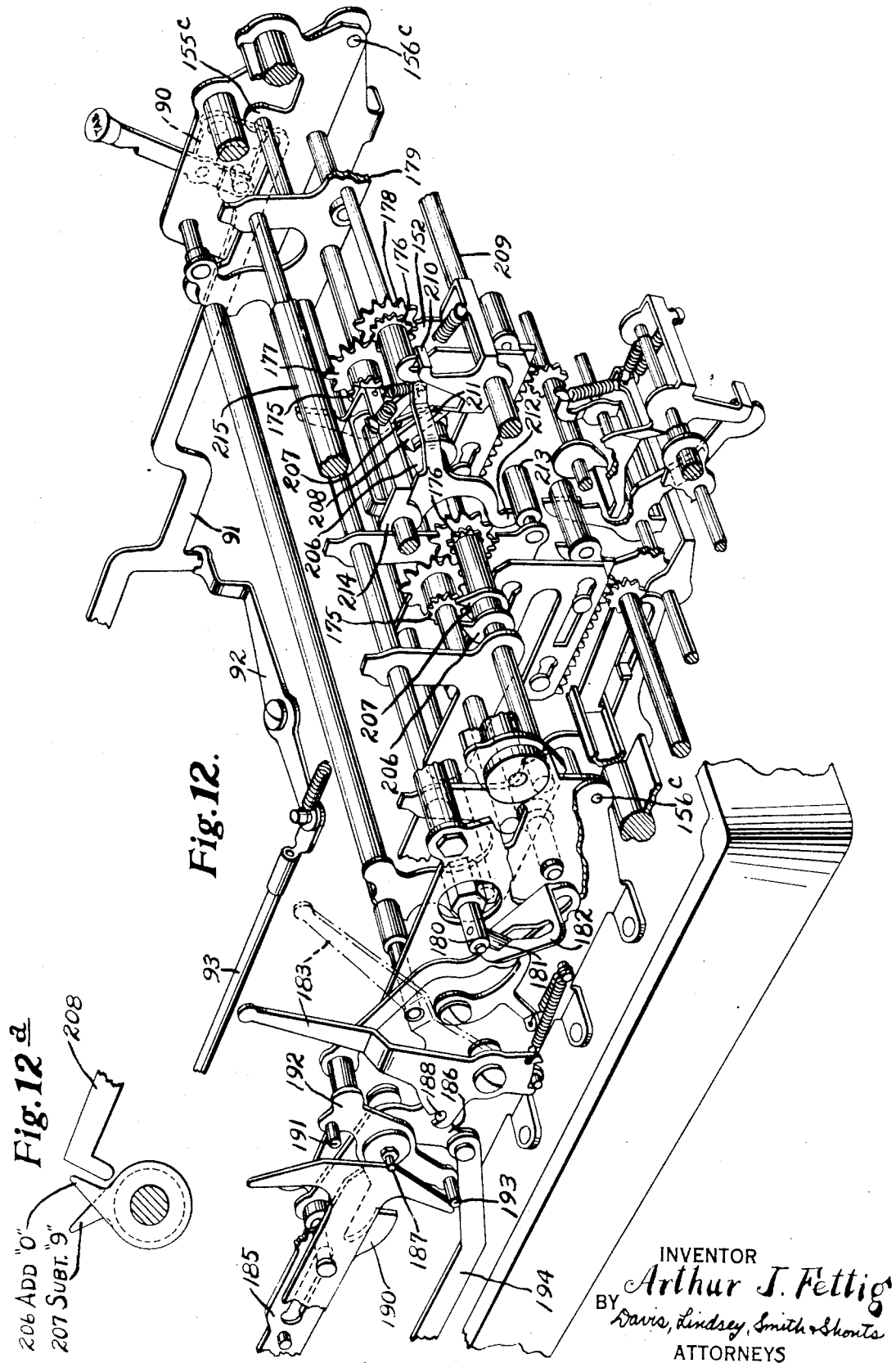
Figure 13:
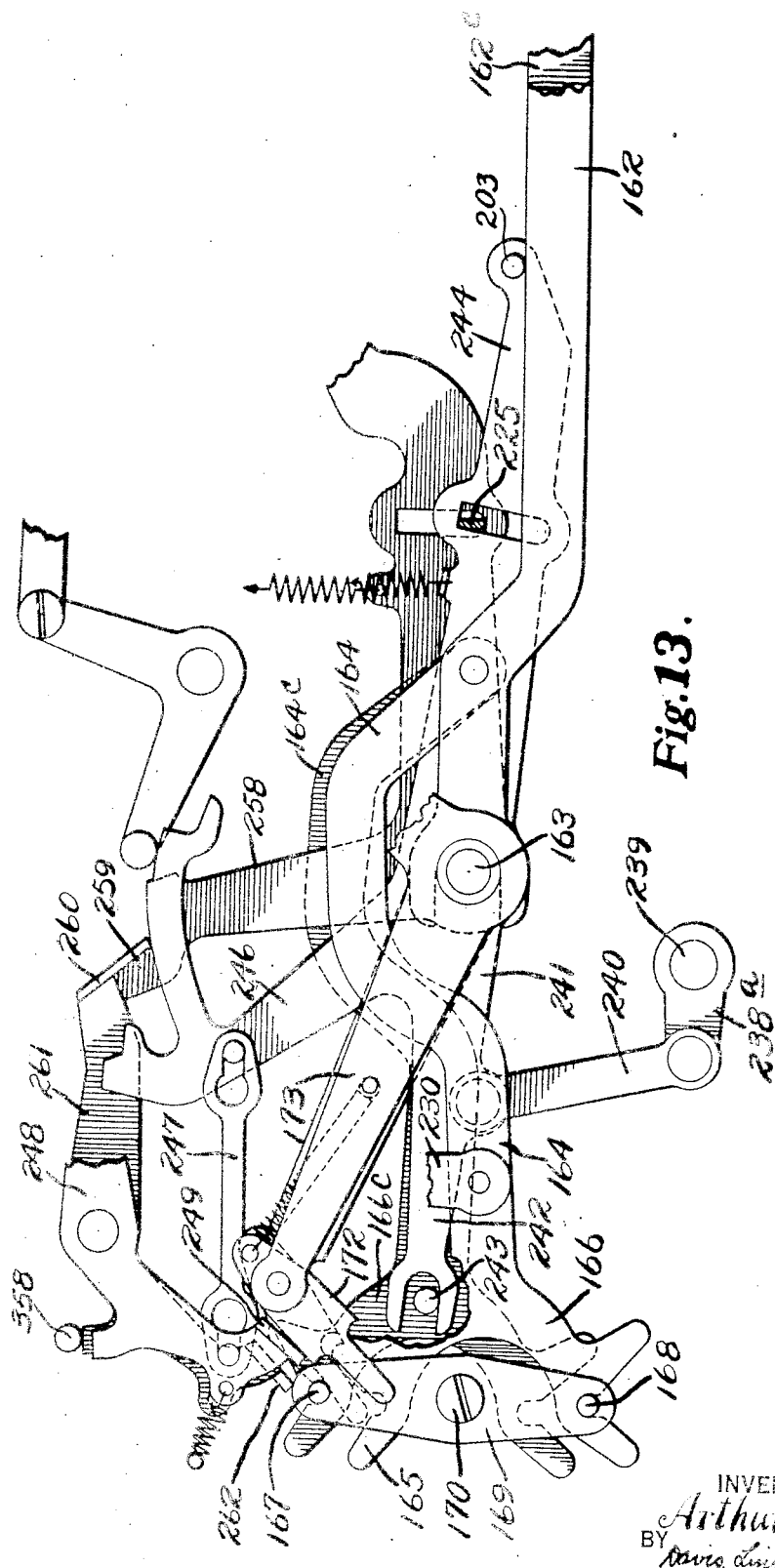

Fig. 4ᵃ is a fragmentary detail of the motor clutch and connections;

Fig. 5 is a detail side elevation showing the motor bar and certain connections thereto;

Fig. 6 is a rear view showing some of the parts of the machine that are more especially connected with the invention and illustrating those parts in position just after the carriage has been returned from column 3 to column 1 and before the machine has been operated in column 1;

Fig. 7 is a perspective detail taken from the left rear corner showing the automatic means for sub-totaling certain of the registers;

Fig. 8 is a spread perspective of the indicating means which is set by the operator to determine the number of automatic cycles of the machine;

Fig. 9 is a perspective view of one of the index bars of the machine showing the zero stops and the releasing means therefor;

Fig. 10 is a detailed view of the indicator and associated mechanism in normal position;

Fig. 11 is a left side elevation of the add and subtract mechanism as controlled by the carriage;

Fig. 12 is a partial front perspective from the left corner illustrating the crossfooter shifting mechanism for add and subtract, the transfer mechanism for both the crossfooter and lower register and carriage normal key and connections;

Fig. 12ᵃ is a diagrammatic detail of the transfer cams;

Fig. 13 is a fragmentary detail illustrating the parts with the total key depressed and the machine at the end of the forward stroke; and Fig. 14 illustrates a sample of work that may be performed.

The invention is shown applied to a Burroughs machine of the so-called low or flat-keyboard type of machine illustrated in many patents such as Gooch No. 1,395,044 and No. 1,327,318, and by Peters No. 1,255,821.

General construction

The machine is provided with a plurality of banks of depressible amount keys 10 by means of which items are indexed in said machine. When a key is depressed it is latched in position by a latching bail 11 (Fig. 9) until near the end of a machine cycle when all the keys are released by a restoring slide 12 (Fig. 9).

When depressed the lower ends of the key stems are projected into the paths of lugs 13 (Fig. 2) on index, or stop bars 14, of which there is one for each order or bank of the machine. These index bars are retained in zero position by zero or cipher stops 15 formed integrally with latches 11 (Figs. 2 and 9) which engage lugs 16 on the bars as shown in Fig. 9. When an amount key is depressed a cam lug 17 on its stem (Fig. 9) rocks latch 11 and the zero stop 15 for said bank out of position to free the index bar for movement.

The rear ends of the index bars 14 (Fig. 2) are connected to respective bell crank levers 20 pivoted at 21. These bell cranks have upwardly extending curved arms carrying type 22, the arrangement being such that the type are differentially positioned in front of a platen 23 at the time the index bars are positioned. After the type are differentially positioned and near the end of the first half of the machine cycle, a printing mechanism which may be like that shown in the Gooch Patent No. 1,395,044 operates to drive hammers 24 against the type bars to print the item on paper held about the platen 23.

The bars 14 are urged forwardly by the springs 18 (Fig. 2), which thereby also urge the arms carrying the type 22 upwardly, but the bars 14 are normally held one step of movement to the left beyond their "0" positions and the arms carrying the type 22 are likewise held one step below their "0" positions as shown in Fig. 2 by the bail 19 engaging the forward edge of the downwardly extending arms of the bell crank levers 20. When the machine is given a cycle of operation, the bail 19 is moved away from the downwardly extending arms of the bell cranks 20 to permit the bars 14 to move forwardly and the arms carrying the type 22 to move upwardly under the urge of their springs to their "0" positions, where they are limited by the "0" stops for printing ciphers in orders where no amount keys have been depressed and permit the bars 14 and arms carrying the type 22 to move to differential positions in orders where amount keys are depressed. During the latter part of the cycle, the bail 19 is returned to normal position to return the bars 14 and type 22 to their normal positions, also as disclosed in Peters Patent 1,255,821.

Carriage tabulation

Provision is made for having printing occur in different columns on the paper by mounting the platen on a traveling carriage 30 and by moving the carriage from column to column across the machine. Referring to Fig. 6 the carriage is returned, i. e., urged to the left in said figure, or to the right as viewed from the front of the machine, by a spring drum 31 connected by a tape 32 to the carriage. The carriage is moved to the right in Fig. 6 or to the left when viewed from the front of the machine, in tabulating direction by power derived from the drive shaft 33 (Fig. 6). This shaft is rocked during each machine cycle and carries a block 34 having a cam slot 35 in it. Positioned in this slot is a stud 36 on the lower end of a lever 37 pivoted at 38. Pivotally mounted on the upper end of the lever 37 is a pawl 39 having a shoulder 40 upon its right end and urged counterclockwise by a spring 41. As the machine is cycled and shaft 33 is rocked, the lever 37 is first rocked counterclockwise (Fig. 6) moving the pawl 39 with it. Near the end of the movement of said lever, shoulder 40 snaps behind one of the adjustable tab stops 42 on the column stop bar 43 of the paper carriage. Then, as the lever 37 moves clockwise, the carriage is tabulated or moved to the right against the tension of its spring 31 until the tab stop 42 passes slightly beyond the abutment arm 44, in which position the carriage is held by pawl 39 until return movement thereof. When pawl 39 returns, upon the next cycle, the carriage drops back slightly until the stop 42 engages the abutment 44 which holds the carriage while pawl 39 moves to the left to engage the next stop 42. Abutment 44 is pivoted at 45 to the machine frame, is urged counterclockwise by spring 46, and extends to the left where it is attached to a vertical slide 47, the purpose of which will appear later.

Carriage return

As the carriage is moved to the right (Fig. 6) into its last position which is in number 3 column in the present case, a carriage roll 48 engages and depresses the upper arm of a lever 128, which is pivoted at 129 and the lower arm 130 of which engages and moves a yoke 49 to the right in order to condition the line spacing mechanism to space the platen after printing the third column, as will be described hereinafter. Yoke 49 is supported by a shaft 50 and is utilized to control the carriage return movement as follows:

For this purpose one end of a link 51 supported by lever 52 pivoted at 38 is connected to the bail 49 and extends to the left where it is provided with an extension 53 which under certain conditions is adapted to underlie a rearwardly projecting lug 54 formed on a vertical slide 55 slidingly supported by shaft 50 and a parallel shaft 56. Slide 55 is urged upwardly by a spring 57 and is also provided with a laterally projecting lug 58. The extreme left end of pawl 39 carries a stud 59 which when the pawl is moved to its extreme left position engages the lug 58 and tends to move slide 55 downwardly against the action of its spring 57 if the slide is free to move. With the carriage in column 3, yoke 49 is moved to the right by the roll 48 and places the extension 53 under lug 54 thereby preventing downward movement of slide 55. Under this condition as the pawl 39 moves to the left, its left end is cammed upwardly by stud 59 on its left end, engaging the cam-shaped lug 58 until a hooked finger 60 formed integrally with the pawl is lowered sufficiently to engage a latch 61 to retain pawl 39 in lowered position to prevent it from engaging a stop 42 thereby disabling the tabulating mechanism. The latch 61 is pivoted on the lever 37 and urged clockwise in Fig. 6 by the spring 41.

After an amount has been printed in column 3 and the machine starts on the return stroke, pawl 39 being held in lowered or clockwise position by latch 61, the stud 59 will engage the underside of the abutment 44 and rock the latter clockwise causing its right end to release the stop 42 by which it holds the carriage in the third columnar position thus freeing the carriage and permitting it to be moved to the left (Fig. 6), that is, returned by its drum spring 31. The carriage moves to the left until the first column stop 42 engages the margin stop 62 slidingly connected to the stationary frame and spring urged to the right (Fig. 6) by spring 63. This stop is provided with an upwardly projecting portion 75 engageable only with the first column stop, the others being slotted or notched at 65 as indicated in Fig. 6 to permit passing of the stop projection 75.

As the carriage moves to the left and the stop 42 of column 1 engages the margin stop 62 the latter is slid to the left to the end of its slotted connections and stops the carriage. During this movement to the left of the stop 62 the left end thereof engages a stud 61a on an arm of latch 81 and rocks the latter counterclockwise to release the pawl 39 which then rocks counterclockwise until stopped by a stud 64 carried by the sliding margin stop 62. This temporarily prevents pawl 39 from moving upward and engaging the stops 42. During the forward stroke of the next machine operation pawl 39 moves to the left and clears stud 64 and is then permitted to engage the stop 42 for column 2.

Means are also provided to prevent operation of the machine while the carriage is being returned, that is, while the carriage is traveling from column 3 to column 1. This mechanism is shown briefly in Figs. 4 and 4A.

It will be recalled from the foregoing description that when the machine is operated in the third column slide 55 is prevented from moving downward and this causes pawl 39 to be rocked and held in its clockwise position by a latch 61, thereby causing abutment 44 to be rocked to release the carriage for return movement to the left. The left end of abutment lever 44 is connected to a vertical link 47 (Figs. 4 and 6) which link is connected to a lever 66 pivoted at 67 and which is moved clockwise upon lowering of link 47. The forward end of lever 66 is in position to engage another lever 68 pivoted at 69 connected to a lever 70 pivoted at 71 and having a forward extension adapted to engage a slide 72 supported on a stationary bracket 73. The lower end of slide 72 is provided with a laterally projecting lug 74 adapted to engage a clutch control lever 76. The clutch control lever 76 is one arm of a three-arm yoke 77 (Fig. 4a) pivoted on shaft 78 and having two other arms 79 and 80. Shaft 78 is provided with a half round portion against which the clutch member 81 limits as disclosed in a Vincent Patent 866,750 of September 24, 1907. As disclosed and described in this patent when the half round shaft 78 is rocked counterclockwise the clutch member is released to move counterclockwise to cause a machine operation by a single counterclockwise revolution of shaft 78a (Fig. 4a). Motor bar control is through a lever 82 fixed on shaft 78 and another lever 84 pivoted on shaft 78. Lever 82 fixed to shaft 78 supports an adjusting screw adapted to engage the lower arm 80 of yoke 77 and lever 84 pivoted on shaft 78 is connected to the upper arm 79 of yoke 77 by a spring 85. Lever 84 is also connected to an arm 148 which is the means for tripping the clutch through depression of the motor bar, as will be explained later. The arrangement is such that when the motor bar is depressed lever 84 is rocked counterclockwise causing the spring 85 to rock the three-arm yoke 77 counterclockwise, the latter releasing the clutch member 81 through arm 82 resulting in a single revolution of shaft 78a.

The upper arm 79 is in position to be engaged by a cam edge 86 (Fig. 4a) formed on an arm 87 (Fig. 4) which is connected by a link 88 to the full stroke sector 89. Arm 87, link 88 and full stroke sector 89 corresponds to the parts 32, 33 and 34, respectively, illustrated in Fig. 1 of the Muller Patent 2,001,367. In that machine the sector 34 is oscillated from the usual hand crank. The present machine is a power driven rather than a hand operated machine and the sector is driven from a motor M through shaft 78a as follows. This latter shaft has an arm 82a fixed thereto and connected to a link 83 which link is also connected to an arm 83a fixed to a main drive shaft 33 which carries sector 89. As previously described sector 89 is connected by link 88 to arm 87. During the forward machine stroke arm 87 is moved counterclockwise by the full stroke sector 89 through the connecting link 88 during which movement the cam 86 engages lever 79 and rocks the latter and yoke 77 clockwise to permit the arm 82 and shaft 78 to be restored to normal position by the usual spring (not shown). This prevents a second release of the clutch member until the previous machine operation has been fully completed, at which time the arm 87 will restore to normal position and release the yoke 77.

As the machine is operated in column 3 from where the carriage is to be returned to column 1, stud 59 on pawl 39 causes abutment 44 to be moved to release the carriage for its return movement to column 1. The abutment is held in its disabled position by the stud 59 on pawl 39 which is latched down by latch 61. This causes the link 47 to be held in its raised position during the entire return of the carriage until the latter arrives in column 1. Accordingly, slide 72 will be moved downward and held in this position after the yoke 77 is moved clockwise by the cam 86 during the machine operation in column 3. At the end of the machine operation, yoke 77 is prevented from restoring counterclockwise by the lug 74 which is in the path of the arm 76 thereby preventing yoke 77 from restoring and preventing the clutch from being tripped again during the return of the carriage.

In the present machine which embodies a repeat print mechanism by which the motor bar may be locked in depressed condition as hereinafter described, the machine is prevented from operating during the time the carriage is returning from column 3 to column 1, but when the carriage arrives in column 1 the latch 61 is released and the slide 72 is allowed to rise out of contact with arm 76, so that, if the motor bar is latched down, the spring 85 remains tensioned and can again rock the yoke 77 to cause a further cycle of operation automatically.

*Carriage normal key*

Figure 1:
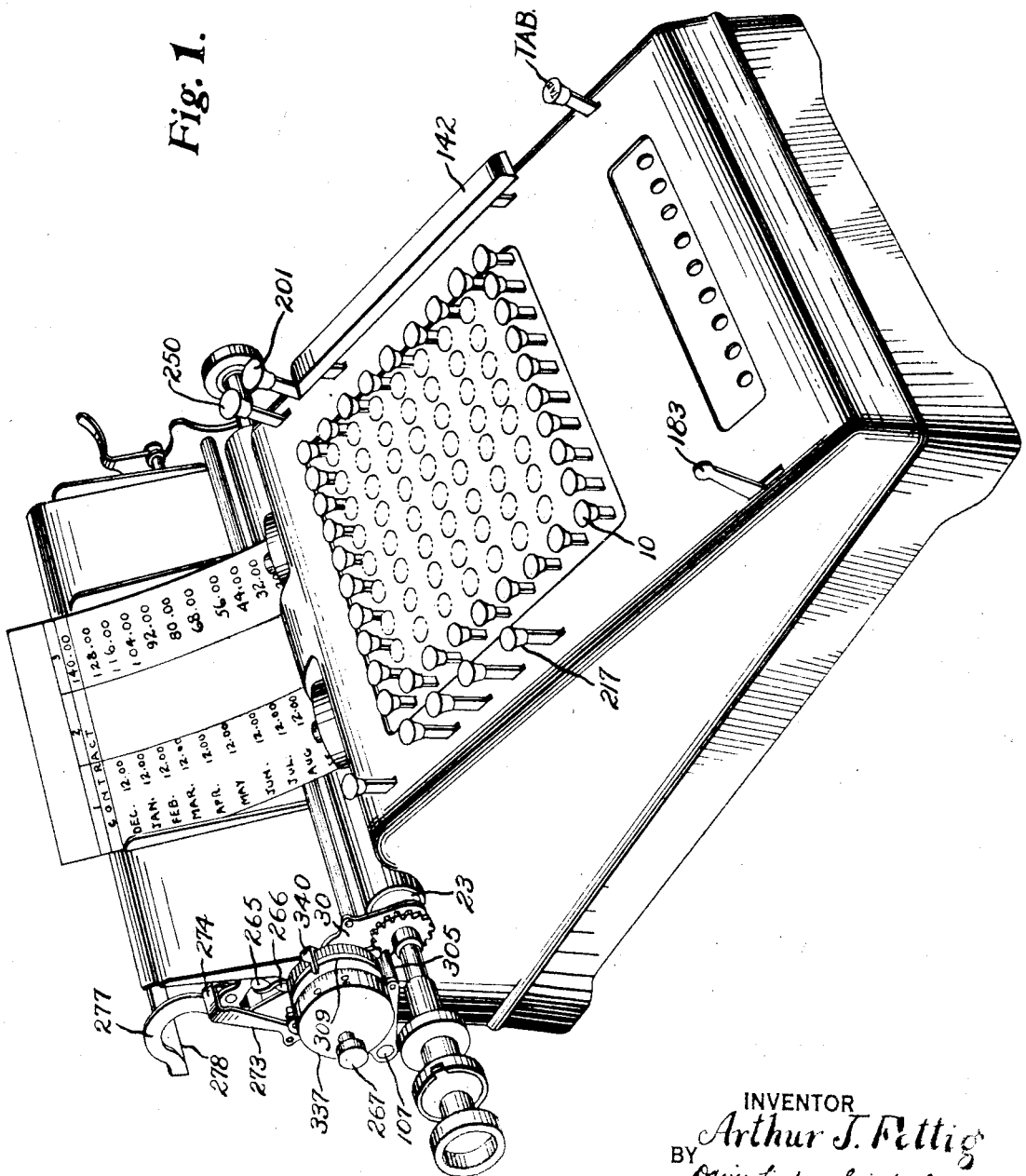
Figure 1 is a perspective view of a machine embodying the principles of this invention.

The machine is also provided with a carriage normal key which is shown more clearly in Figs. 1 and 12 where the key is indicated as TAB. When this key is in its upper or normal position, it disables the carriage tabulating and return mechanism and when depressed and latched by a notch in the stem engaging the casing, it enables the carriage tabulating mechanism so that the carriage tabulates into each column and returns automatically as previously described.

This carriage normal key is connected by a crank 90 (Fig. 12) to a link 91 which, when the key is depressed, moves forward to rock a lever 92 clockwise, the latter moving the rod 93 rearward. Rod 93 is atttached to a crank 94 (Fig. 6), the latter having a stud 95 positioned in a groove of a bushing or collar 96 freely supported on shaft 33, but having a key 97 attached to it which slides in a notch of a hub 98 fixed to shaft 33. The outer end of key 97 projects sufficiently to engage in a notch in the cam plate 34 when the carriage normal key is depressed. That is, when the TAB key is depressed, the key 97 is moved sidewise to engage the notch in cam 34, thereby connecting the cam 34 to the fixed hub 98 and thereby to the shaft so that it rotates therewith. When the TAB key is released to its raised position, the key 97 is moved laterally out of engagement with cam 34, thereby disconnecting the cam 34 from the shaft 33 and thus disabling the carriage tabulating mechanism.

Means are also provided, as shown in Fig. 12, for permitting the "TAB" key to be latched in its depressed position while the case is removed from the machine. Such means comprises a hook-shaped lug 91a extending from the upper edge of the link 91 and a stud 91b on the lower end of the stem of the "TAB" key. If, after depressing the "TAB" key, it is rocked forwardly farther than would be permitted by its slot in the machine case, the stud 91b engages under the hooked lug 91a and thus latches the "TAB" key down as shown in Fig. 12.

Line spacing

The paper may be line spaced by a line space mechanism that automatically line spaces the platen as follows:

As previously stated, the drive shaft 33 (Fig. 4) is rocked first counterclockwise and then returned clockwise during each machine cycle. Fixed to shaft 33 is a bell crank 100 connected by a link 101 to an arm 102 fixed to shaft 56 journaled in the frame of the machine. This shaft has another arm 104 fixed to it, the upper end of which is adapted to engage a stud 105 on an arm 106. The latter arm is slidable on a square shaft 107 on the paper carriage but is restrained by a stationary guide (not shown) against moving laterally with the paper carriage and is urged clockwise with the shaft by a spring 108.

During the forward stroke of a cycle of operation, the shaft 33, bell crank 100, arm 102, shaft 56 and arm 104 are rocked counterclockwise and the spring 108 causes the arm 106 and shaft 107 to rock clockwise and the stud 105 to follow the arm 104. During the latter half of the cycle the arm 104 returns to its Fig. 4 position and rocks arm 106 counterclockwise. In other words, during each machine cycle, the square shaft 107 is oscillated.

As shown in Fig. 10, the shaft 107 has an arm 110 fixed to it. Pivoted at 111 on this arm 110 is a line space pawl 112 which is urged counterclockwise (Fig. 10) against a limit stud 114 by a spring 113. The end of the line space pawl is adapted to engage teeth 115 of the ratchet wheel 116 fixed to the platen shaft. As viewed in Fig. 10, the shaft 107 is first rocked counterclockwise and then returned clockwise. During the counterclockwise movement, the line space pawl 112 is drawn back and then during the clockwise movement said pawl engages the teeth 115 to line space the platen. A detent 117 is employed to hold the platen in the line space position to which it is moved. The number of lines that the platen is spaced may be varied by a hand lever 118 pivoted at 119 and provided with a lug 120 which may be positioned to engage the end of lever 110 or not as the latter is rocked counterclockwise by the action of spring 108 (Fig. 4) on arm 107.

In connection with the prepayment plan disclosed herein, the line spacing mechanism is preferably adjusted to line space the platen two line spaces when spaced. Also, it is not desired that the platen be line spaced for each machine cycle but, instead, the machine is to be given three cycles before the platen is line spaced—the operation desired being that the machine operates in a No. 1 column, and in a No. 2 column without line-spacing, and then in a No. 3 column, after which the platen is line spaced and the carriage returned to No. 1 column. The control for this action of the line spacing mechanism to line space after each line of entries is by the carriage.

Referring to Fig. 6, the arm 106 carrying stud 105 has a relatively long stud 125 projecting from it. Positioned beneath this stud is a lug 126 on the yoke 49 slidably mounted on shaft 50. As long as the lug 126 is under stud 125, the arm 106 can not be moved by its spring 108 and the line space mechanism will not be operated. The lug 126 remains in the position of Fig. 6 until the paper carriage moves into its No. 3 column when the roll 48 on the carriage engages the cam end of lever 128 pivoted at 129, the lower end 130 of said lever being adapted to engage the yoke 49 which is urged to the left (Fig. 6) by a spring 131. When this occurs the lever 128 is rocked counterclockwise, the yoke 49 is slid to the right in Fig. 6, and the arm 106 is freed so that line spacing will occur during the latter part of the machine cycle with the paper carriage in its No. 3 position.

Operating means

The machine may be given cycles of operation by means of a hand crank as shown in Patent No. 2,001,367 but it is preferably cycled by a motor drive. As shown in Fig. 2, an electric motor M is provided which operates through a clutch mechanism 141 to cycle the machine. The motor and clutch are controlled by a motor bar 142 (Figs. 4 and 5). When the bar 142 is depressed, the cross bar 143 is moved downward which causes a stud 144 on a depending finger of the bar 143 to engage and rock a lever 145 clockwise, said lever being pivoted at 146 and urged counterclockwise by spring 147 which tends to urge the motor bar upwardly to undepressed position. The rear end of lever 145 has a downwardly extending portion 148 which is connected to lever 84 as previously mentioned to control the clutch member 81; thus, when the motor bar is depressed, the motor will give the machine a single cycle of operation. During this cycle the drive shaft 33 (Fig. 4) is first rocked counterclockwise and then returned clockwise to normal.

Registering mechanism

The machine has a registering mechanism or totalizer 150 (Fig. 2) which is capable of both addition and subtraction and which will be called the add-subtract register or balance totalizer also known as the crossfooter, and also another registering mechanism or totalizer 151 capable of addition only. This will simply be called the add register or totalizer.

The registers or totalizers are driven by racks on the forward ends of the index bars 14, there being a set of upper racks 152 for the add-subtract register and a set of lower racks 153 for the add register. Each set of racks is movably supported on the index bars so that said racks may move an extra step relatively to the index bars to effect tens-transfers, as will be described later.

The registers are connected to and disconnected from the actuators, or racks, by mechanism which is substantially the same for both registers, and the description will be confined mainly to the mechanism for register 151.

The add register 151 which contains only a single set of pinions is carried by a frame 155 pivoted at 156, said frame being urged counterclockwise in Fig. 2 by a spring 157 so that the register is constantly urged out of engagement with the actuators. The register frame 155 has a rearwardly extending arm 158 carrying a stud 159 adapted to cooperate with the upper side of the pointed cam nose of a cam 160 pivoted at 161. When the cam 160 is in the position of Fig. 2, the register frame 155 is held against movement by its spring 157 and the register is in engagement with the actuators 153. Connected to cam 160 is a link 162 whose rear bifurcated end is slidably mounted on shaft 163. Pivotally connected to the rear end of link 162 is an arm 164 (Figs. 2 and 13) whose rear end is Y-shaped to provide an upper branch 165 and a lower branch 166. Each branch has a notch formed in it adapted to fit over the respective studs 167 and 168 on an oscillatable lever 169 pivoted at 170. The studs 167 and 168 project on both sides of the lever 169 (Fig. 7) and a pass-by pawl 172 having two shoulders on its upper and lower sides as shown in Figs. 2 and 13 and pivoted on the end of lever 173 fixed to shaft 163 is adapted to cooperate with said studs on the side of the lever opposite to that on which arm 164 is positioned. The operation is as follows:

At the beginning of the cycle the parts are in the position shown in Fig. 2. As the shaft 163 is rocked clockwise by a connecting link (not shown) from shaft 33 as shown in the Rinsche Patent 1,234,218 and the Gooch Patent 1,395,044, the shoulder on the lower side of the pass-by pawl 172 engages stud 168 and rocks lever 169 clockwise which pulls arm 164 and link 162 rearward, moves cam 160, and frees register 151 to enable it to be moved out of engagement with the actuators by its spring 157. This action occurs prior to movement of the actuators. During the first half of the cycle, the actuators move to differential positions, and the printing mechanism operates. Near the end of the first half of the cycle, the shoulder on the upper side of the pass-by pawl 172 moves in front of stud 167, and, upon return movement of arm 173, the pass-by pawl engages stud 167 and rocks lever 169 counterclockwise to thrust link 162 forward again. This moves cam 160 whose nose engages stud 159 and rocks the register frame 155 clockwise to re-engage the register with the actuators. This movement occurs prior to any return movement of said actuators. During the second half of the cycle, the actuators are restored to normal by bail 19, and the register pinions are rotated to accumulate the amount of the item that was indexed in the machine.

The crossfooter or add and subtract register 150 contains two complete sets of wheels or pinions, a set of add pinions 175 and a set of subtract pinions 176 (Fig. 12). These two sets of add and subtract pinions are engageable with the racks 152 for calculating operations but are not directly in mesh with each other as is the usual custom. Instead, the add wheels are attached to larger gears 177 while the subtract pinions are attached to a similar set of gears 178, the larger gears being in constant mesh with each other at all times so that when the addition wheels are rotated in a clockwise direction for addition, the subtract wheels are rotated counterclockwise. Although both the add and subtract pinions are engageable with the adding racks 152, they are offset from each other, that is, the add pinions 175 are located to the left of the subtract pinions 176. Provision is made for sliding the register wheels laterally under control of an add and subtract device in order to align either the add pinions or the subtract pinions with the racks 152.

The crossfooter 150 in general is supported on a frame 155C (Figs. 2 and 12) pivoted at 156C and is rocked toward and away from the racks at the proper time. The transfer mechanism, later to be described, is also supported by the frame 155C and also moves with the crossfooter frame and pinions as the latter move to and from engagement with the racks. To permit sliding movement of the crossfooter pinions for add and subtract operations, the pinions are supported by an independent subframe 179 (Fig. 12) which is slidably supported by the frame 155C, this sliding frame being moved back and forth by a shaft 180 having a stud 181 engaged in a cam slot in a plate 182 which is movable forwardly and rearwardly under control of the paper carriage and also a manually operated shift lever 183, as will be described later.

The means for moving the pinions of the add-subtract register or crossfooter 150 into and out of engagement with the racks are substantially like those just described for the add register 151. The main frame 155C pivoted at 156C is urged clockwise by a spring 157C (Fig. 2) to disengage said register from the actuators. The frame 155C has a lower rear extension 158C carrying a stud 159C with which cooperates the nose of a cam 160C pivoted at 161. Connected to cam 160C is a link 162C similar to the link 162 heretofore described. Pivoted to link 162C is an arm 164C (Fig. 7) having a Y-shaped rear end with upper and lower branches 165C and 166C, respectively, similar to those of arm 164 and cooperating with the studs 167C and 168C on lever 169C pivoted at 170C. An arm 173C (Fig. 7) carrying a pass-by pawl 172C cooperates with said studs. The operation of the parts is the same as that previously described for the register 151 and the corresponding parts bear the same reference characters with the suffix C.

In crossfooters of this type, the wheels are always disengaged from the racks on the forward machine stroke for both addition and subtraction which is performed during the return stroke of the machine cycle, which means that the lateral position of the crossfooter wheels must be shifted for add and subtract operations. This lateral shifting of the wheels is caused to take place during the forward machine stroke while the wheels are disengaged from the racks.

Although the add and subtract operations are controlled from either carriage or the manual shift lever, the shifting mechanism is merely conditioned by the controls and the actual power for shifting the crossfooter laterally, is supplied by the motor during operation of the machine. Referring to Fig. 11, the lever 173 which is fastened to shaft 163 is connected by link 184 through a slot and stud connection 184a to a link 185, the forward end of which has a stud and slot connection with a crank 186 pivoted at 187 to the stationary frame. Crank 186 is also connected by stud 188 to the hand shift lever 183. The forward end of lever 185 has two arms 189 and 190, the upper arm 189 of which is engageable with a stud 191 on the upper end of a lever 192 which is pivoted at 187 and connected to the cam slide 182. The lower arm 190 of lever 185 is engageable with a stud 193 on the lower end of the lever 192. The arrangement is such that when the shift lever 183 is in counterclockwise or add position the upper arm 189 is raised so that during the forward machine stroke it will engage stud 191 and move the cam slide 182 forward to shift the crossfooter to the right into add position. If the shift lever is moved clockwise to the dot and dash line position, lever 185 is lowered so that the lower forward arm 190 will engage the stud 193, then when the machine is operated and the lever 185 is moved forward, cam slide 182 will be moved rearward and will shift the crossfooter into subtract position. A spear point at the forward end of lever 185 passes either above or below the pivot stud 187 during the machine operation to prevent shifting of lever 183 during a machine operation.

The crank 186 is also under control of the carriage by means of a link 194, the forward end of which is attached to crank 186 and the rearward end having a stud and slot connection with link 195 which, in turn, is connected by crank 196 to link 197, the latter being connected to a carriage control lever 198 actuated by a carriage roll 199 in a well known manner.

A spring 200 connected to the rear end of the link 194 returns the crank 186 and lever 185 to the adding position when no carriage subtract roll is engaged with the control lever 198 and the operator does not hold the lever 183 in the subtraction position.

For certain entries it is desirable to restore the crossfooter to add position by means of the total key 201. For this purpose, the arm 244 which is moved clockwise in a manner hereinafter described when the crossfooter total key 201 is depressed carries a stud 203 (Fig. 11) at its forward end which, when arm 244 is moved clockwise, engages the cam lever 204 moving it slightly clockwise. This cam carries a stud 205 which serves as a connecting means between links 194 and 195. Thus, when the crossfooter total key is depressed, cam 204 moves clockwise, causing link 194 to move rearward, thereby restoring the shift lever 183 from subtract to add position against the urge of a subtraction roll on the carriage. This movement of the lever 183 is permitted because of a yielding connection between 196 and 197.

Tens-transfer mechanism

A transfer mechanism is provided in order to carry or borrow from the wheel of next higher order. This mechanism is generally of the type disclosed in the Sampson Patent No. 2,056,536 but certain distinctions will be pointed out. Each of the hubs on which the subtract pinions 176 are attached also supports an add cam 206 (Figs. 12 and 12a) and a subtract cam 207, the cams being spaced apart a distance equal to the lateral movement of the pinion frame, and the inclined and radial edges of the add cams facing oppositely to those of the subtract cams. The cams are also so arranged that when the crossfooter is in add position and the pinions in any order are in zero position the radial edge of the add cam 206 for said order will be immediately in back of the transfer pawl 208 for said order as shown in the diagrammatical view of Fig. 12a. The subtract cam 207 at this time will not be aligned with the transfer pawl, but if the crossfooter is moved laterally to subtract position, the subtract cam 207 will be aligned with the transfer pawl 208 and in its number 9 position relative to pawl 208 as seen in Fig. 12a.

When an amount is added in the crossfooter, cam 206 is moved counterclockwise, and when the amount is totaled the cam 206 moves clockwise until it limits against pawl 208. As will be apparent, no means is necessary to lock the transfer pawls 208 during totaling.

The transfer pawl 208 (Fig. 12) is pivoted on shaft 209 and has a lug 210 engaged with latch 211, the latter having a downwardly extending arm 212 engaged with stud 213 of rack 152 of the next higher order. A spring 152a (Fig. 9) connected between each rack 152 and its stop bar 14 urges the rack rearwardly relatively to the stop bar but the stud 213 normally stops rearward movement of the rack at the "0" position of the latter until a transfer is effected at which time the transfer pawl is rocked clockwise, releasing the latch, whereupon rack 152 is allowed to move rearward an extra unit of movement thereby advancing the wheels in the next higher order. During subtraction the direction of the wheels is reversed and the subtract cam 207 operates the same carry pawl 208 which releases the rack in the same manner and which effects a borrow instead of a carry in the crossfooter. It will be noted that only the crossfooter wheels and carry cams move laterally from add to subtract and that the same transfer pawl 208 and associated mechanism is used for both add and subtract operations and does not move laterally.

The transfer mechanism for the crossfooter is restored each time the crossfooter is disengaged from the racks and this is accomplished by a yoke 214 in each order which engages a stationary shaft 215 and through spring action resets the latch 211 on the lug 210 of the pawl 208.

The transfer mechanism for the lower register is identically the same in principle but of course there is only one carry cam on the hub of each add pinion of the lower adding register whereas there is both a carry cam and a borrow cam on the hub of each subtract pinion of the crossfooter.

Total taking

In total taking operation the registers are allowed to remain in engagement with the actuators during the first half cycle of machine operation and the actuators are then differentially positioned under the control of the registers. The machine is conditioned for this operation with the add register 151 by the total key 217 (Fig. 2) as follows:

The total key 217 is depressed for total taking and, when depressed, is latched in position by the latch 218. Connected to the stem of said key is one end of a lever 219 pivoted at 220 and having a depending extension 221 adapted to engage a stud 222 on a lever 223 pivoted at 224. Thus, when the total key 217 is depressed and lever 219 rocked clockwise (Fig. 2) the lever 223 is rocked counterclockwise.

Referring to Figs. 2 and 9, when lever 223 is rocked, its free end engages an arm 225 pivoted on a shaft 226. This arm has a lug 227 (Fig. 9) adapted to engage an arm 228 yieldably connected by spring 229 to the key restoring slide 12 which is arranged to engage all the zero stops for the various orders of the machine. It follows that, when the total key is depressed, all the zero stops are moved to free the index bars for movement.

The engagement and disengagement of the add register 151 is controlled by the total key 217 as follows: The rear end of lever 219 (Fig. 2) is connected by a link 230 with the Y-shaped arm 164 and when the total key is depressed, link 230 raises arm 164 to disengage branch 166 from stud 168. This also causes the upper branch 165 to engage the stud 167, said upper branch camming the lever 169 clockwise. The result is that when pass-by pawl 172 is moved at the beginning of the total taking cycle it will not act on stud 168 and the register 151 will be left in engagement with the actuators. During the first half of the cycle the actuators move to differential positions under control of the register pinions and near the end of said half cycle the printing mechanism operates to print the amount of the total. At the beginning of the second half of the cycle the pass-by pawl 172 engages stud 167 to rock the lever 169 counterclockwise. This pulls link 162 rearward, moves cam 160, and allows the register to move out of engagement with the actuators. This occurs while the register is clear and before the return movement of the actuators is started. Near the end of the cycle the arm 173, which is moving counterclockwise, causes a link 231 connected thereto to rock a bell crank 232 counterclockwise. This bell crank engages a stud 233 on link 162 to move the link forward to reengage the register 151 with the actuators after the latter have been returned to their "0" positions.

A total may be taken from the crossfooter or register 150 by depressing the total key 201 (Fig. 2). Referring to Fig. 4, the stem of the total key is connected by a link to a bell crank 234 pivoted at 235. The lower arm of this bell crank engages a stud 236 on a slidable link 237 connected to a lever 238 fixed to a shaft 239. This shaft extends across the machine and its other end (Fig. 2) carries an arm 238a. Arm 238a fixed to shaft 239 is connected by a link 240 to one arm of a three-arm lever 241 (Fig. 13) pivoted on shaft 163. The rear arm 242 of the three-arm lever 241 has a stud and slot connection 243 with the Y-shaped arm 166c so as to permit sliding movement of arm 166c. The construction is such that, when the total key 201 is depressed, the link 240 is thrust upward which, through the three-arm lever 241, lifts the Y-shaped arm 166c in the same manner as arm 166 is lifted by link 230 when the total key 217 for register 151 is depressed.

The downward movement of the arm 244 of the three-armed lever 241 also conditions the addition-subtraction controls of the register 150 for addition as already described.

Depression of the total key 201 also releases the zero stops through the medium of the three-arm lever 241.

As lever 241 is rocked clockwise by depression of the crossfooter total key 201 (Fig. 2), the forward arm 244 (Fig. 13) moved down and because of a slotted engagement therewith depresses lever 225, rocking it clockwise (Fig. 9) to release the zero stops for a total taking operation.

The third or upper arm 246 (Fig. 13) through a connecting link 247 moves a lever 248 counterclockwise and positions a lug 249 of said lever to prevent the pawl 172 from acting on the stud 167. Consequently, the register 151 is not moved into engagement with the actuator racks at the beginning of the second half of the cycle but, instead, is non-added.

Sub-totaling

A subtotal is taken from register 150 by depressing the subtotal key 250. Referring to Fig. 4, the subtotal key stem has a lug 251 overlying a stud 252 on crank 234 so that depression of the subtotal key has the same effect as depressing the total key. The subtotal key stem also carries a stud 253 (Fig. 4) overlying an arm 254 fixed to a shaft 255 (Fig. 4). This shaft extends across the machine where a crank 256 (Fig. 2) is fixed to it. This crank is connected to a link 257 connected to one arm of a bell-crank 258 whose other arm has a lug 259 (Figs. 2, 7 and 13) engaging a lug 260 on a lever 261. This lever 261 is shown in Fig. 7, where it will be observed that it has a lug 262 adapted to disable the pass-by pawl 172c to prevent the register being disengaged from the racks at the beginning of the second half of the subtotal taking cycle.

The subtotal key 250 releases the zero stops in the same manner as the total key 201.

Both the total and subtotal keys 201 and 250 when depressed cause a machine cycle. Referring to Fig. 4, the total key stem, which also moves down when the subtotal key is depressed, carries a yieldingly mounted pawl 263 adapted to engage a stud 264 on the bar 143 to move the latter down when either the total or subtotal key is depressed, to thereby cause a machine cycle.

Example of work

Before proceeding further with the machine description, the type of work to be performed will be explained by briefly explaining one example in order that the following mechanisms may more easily be understood.

As shown in Fig. 14, the amount of the prepayment contract is $140.00. This amount is entered with the paper carriage in its No. 3 position, and printed on the sheet in the position shown in Fig. 14 by depressing the proper amount keys and the motor bar. After printing in column 3 the carriage automatically returns to its No. 1 position, the platen in the meantime being line spaced. The operator then enters the amount of the monthly payments, which in this case is $12.00, and gives the machine a cycle of operation during which the $12.00 is printed in column 1 as shown in Fig. 14. During the latter part of this cycle the carriage tabulates to its No. 2 position.

The next point to be considered is the number of monthly payments. The operator can easily determine this and, after so doing, he sets a mechanism in accordance with said number. He then shifts a control lever and depresses the motor bar, after which the machine goes through a predetermined number of cycles of operation and automatically stops. During these automatic operations the amount of each monthly payment is printed, the balance due after each payment is printed, and these entries are properly line spaced and column spaced as shown in Fig. 14.

It now remains to explain how these results are obtained mechanically.

Predetermined cycles of machine operation

The number of automatic cycles is predetermined by setting a device shown in Fig. 8, but before describing it certain other mechanisms will be explained.

The machine is set into operation for its automatic cycles by setting a hand operated control lever 265 (Figs. 2 and 10) and depressing the motor bar 142 (Fig. 4). The lever 265 is an extension or arm of a member 266 pivoted on a shaft 267 and provided with four additional cam arms 268, 269, 270 and 271. Each of these arms control certain mechanisms to be presently described. The full line position of the lever 265 and the four arms shown in Fig. 10 is the inactive position of the parts. When the operator desires to condition the machine for automatic cycles he moves lever 265 to the dot-dash position of Fig. 10 which, of course, moves the four arms a corresponding distance counterclockwise.

Taking first the arm 268 which is utilized to cause the motor bar to be latched down for a plurality of cycles of operation, it will be observed that when the parts are in the Fig. 10 position the end of this arm engages a stud 272 on an arm 273 of a yoke 274 pivoted at 275. This yoke is urged counterclockwise, as viewed in Fig. 10, by the spring 276, one end of which is secured to the arm 273, until stud 272 engages arm 268. The other arm 277 of the yoke projects rearwardly (Fig. 2) where it is connected to a bail 278 extending the length of the paper carriage. Referring to Fig. 6, the bail 278 engages a roller stud 279 on the end of a slide 280 slidingly supported by a stud 281 on a stationary bracket 282 and urged upward by a spring 283. The slide 280 extends to the left (Fig. 6) and then downwardly where it is connected to an extension 284 of a lever 285 pivoted at 38. This lever has another arm 286 provided with a lateral lug 287 (Fig. 4) positioned under a stud 289 (Figs. 4 and 6) on one arm of a bell crank 290 (Fig. 4) pivoted at 291. The other arm of said bell crank is connected to a link 292 which extends forwardly to where it is connected to one arm of another bell crank 293 having a hooked end 294 adapted to pass over the stud 264 on the bar 143 that is moved downward when the motor bar 142 is depressed. The bell crank 293 is urged counterclockwise (Fig. 4) by a spring 295.

When the parts are in the position of Fig. 10, the arm 273, yoke 274, and arm 277 are held against counterclockwise movement and the slide 280 (Fig. 6) is held upward by spring 283. This holds the lever 285 in the position of Fig. 6, which holds lug 287 under stud 289 and prevents bell crank 293 (Fig. 4) from being rocked counterclockwise by its spring 295. But when the control lever 265 is moved to the dot-dash position of Fig. 10, the arm 268 moves out of the path of stud 272 and the yoke 274 with its arm 277 is rocked counterclockwise by spring 276. This moves the bail 278 (Fig. 6) to its dot-dash position and moves slide 280 downward, the spring 276 (Fig. 10) overcoming the spring 283 (Fig. 6). This, in turn, rocks lever 285 counterclockwise and lowers lug 287 thereby releasing stud 288 so that spring 295 (Fig. 4) may rock bell crank 293 counterclockwise when it is free of stud 264. It follows that, if the motor bar is depressed after control lever 265 is moved to the dot-dash position of Fig. 10, the hooked end 294 of bell crank 293 will pass over stud 264 (Fig. 5), after the motor bar is depressed, and hold said bar depressed until some mechanism acts to release it. This release, after a predetermined number of cycles, is controlled by the fourth arm 271 as follows:

Journaled loosely on shaft 107 (Fig. 10) is a bell crank 304, 306, the arm 304 of which has a stud 305 on its end adapted to be engaged by the end of the fourth arm 271 when the latter is in the position shown in Fig. 10. The other arm 306 of this bell crank has a stud 307 on its end to which one end of spring 276 is connected, the spring serving to urge the bell crank, as well as the arm 273, counterclockwise; that is, it tends to urge the arm and crank together. When the control lever 265 is moved to the dot-dash position of Fig. 10, the end of arm 271 moves out of the path of stud 305 and at the same time arm 268 moves out of the path of stud 272 allowing the spring 276 to urge arms 273 and 306 toward each other. However, crank 304—306 can move only slightly in a counterclockwise direction because a stud 306 on arm 304 engages the periphery of a disk 309. The arm 273, however, moves counterclockwise under urge of spring 276 until it limits against stud 307 carried by arm 306 thereby lowering bail 278 and slide 280 (Fig. 6) against the tension of spring 283.

The disk 309 is journaled loosely on the shaft 267, said disk being connected to a hub 310 shown in Fig. 8.

Provision is made for advancing this disk a predetermined distance during each machine cycle under control of the second and third arms 269 and 270 as will presently be explained. The disk has a notch 311 in it, which when it comes opposite stud 308 on arm 304 allows said arm to move counterclockwise under the urge of spring 283, the spring 276 still holding the stud 307 against the edge of arm 273 and causing the bell crank 304, 306 to move counterclockwise as the yoke 274 is moved clockwise by the slide 280 as the latter is moved upwardly by spring 283. This rocks lever 285 clockwise and the lug 287 engages stud 289 to rock bell crank 290 (Fig. 4), link 292, and bell crank 293, the spring 283 for slide 280 being strong enough to overcome the spring 295 (Fig. 10) for bell crank 293. The result is that the hooked end 294 of bell crank 293 is moved from over stud 264 and the motor bar is released for return to normal, said bar being urged to normal undepressed position by spring 147 (Fig. 4).

It thus becomes apparent that when the control lever 265 (Fig. 10) is moved to its dot-dash position it conditions mechanism such that, after the motor bar is depressed, the machine continues to cycle until the disk 309 has been moved far enough to cause the notch 311 to come opposite stud 308 on arm 304. The disk is moved by mechanism as follows:

Referring to Fig. 4, it will be recalled that the shaft 107 is oscillated by the parts 33, 100—106 at the end of each line of entries.

The platen spacing lever 110 (Fig. 10) fixed to shaft 107 carries a stud 314 positioned in the forked end of a lever 315 fixed to the inside end of a stud 316 which passes through a stationary plate 317 on the paper carriage. Fixed to the other end of stud 316 is a lever 318 which carries a pawl 319 urged clockwise (Fig. 10) by a spring 320 to engage the teeth 321 of a gear 322 journaled loosely on shaft 267. The gear 322 is connected to the disk 309 by means of a toothed lug 323 (Fig. 8) on the disk which engages the teeth 321 of gear 322.

When the control lever 265 (Fig. 10) is in its full line position, the second arm 269 holds pawl 319 in inactive position but, when said lever 265 is moved to its dot-dash position, the pawl 319 is released to engage the teeth of gear 322. Then, as the shaft 107 is rocked counterclockwise during the machine cycle with the carriage in its column No. 3 position, the gear 322 is advanced by said pawl 319 and the disk 309 is likewise advanced.

A detent is provided to prevent reverse movement of said gear 322, said detent being in the form of a pawl 325 pivoted at 326 to the stationary plate 317 on the carriage. The detent is urged clockwise by a spring 327 and is normally held in inactive position by the end of the third arm 270. But when the control lever 265 is moved to its dot-dash position (Fig. 10) the detent is released for movement to active position.

It will thus be seen that the disk 309 is automatically advanced each time the line space mechanism is advanced while the control lever 265 is in the position shown in dot-dash lines in Fig. 10. The distance of movement of the disk is independent of the extent to which the platen is line spaced because the end of the second arm 269 acts as a shield to cause the pawl 319 to engage only one tooth of gear 322 regardless of the extent of movement of the line spacing lever 110. It now remains to describe how the number of machine cycles is predetermined.

Referring to Fig. 8, the disk 309 is urged toward the gear 322 by a spring 335 surrounding shaft 267 and engaging the inner end of hub 310. Spring 335 is held in position on the shaft by screw 336. Fitting over the hub 310 of disk 309 is an indicator dial 337 which is held against rotation on the hub by the key 338 and which is held on said hub by a knob 339 screw threaded on to the hub 310. It will be evident that, when the parts are assembled, the operator can pull outward on knob 339 to pull disk 309 away from gear 322 after which the disk 309 can be turned independently of gear 322 to locate its notch 311 at any position relative to the position of the gear. A pointer 340 (Fig. 10) is provided on an extension of the stationary plate 317 and the figures on the indicator 337 are arranged so that by setting them relative to the pointer the number of machine cycles or preferably the number of payments may be predetermined.

The gear 322 has a "home" position toward which it is urged by a coil spring 341 (Fig. 8) attached at one end to the gear and having its other end hooked into a notch 342 in a sleeve fixed to shaft 267. A lug 343 (Fig. 8) on the gear 322 strikes stop 344 (Fig. 10) when the gear is in "home" position. The stop 344 is in the form of a bell crank pivoted on a stud 345 on the stationary plate 317 and urged to blocking position by a spring 346.

It will be understood that, when the control lever 265 is in its full line position of Fig. 10, the pawl 319 is held in inactive position, the detent 325 is held inactive, and the stud 308 on arm 304 is held away from disk 309. The gear 322 will, at this time, be held in its "home" position by the spring 341. The operator may then set the indicator 337 (Fig. 8) at a desired position to obtain the number of machine cycles he wishes. The indicator may be, and preferably is, marked to indicate the number of periodic payments rather than machine cycles, since there are three machine cycles in the machine disclosed for recording each payment.

After setting the indicator, the operator moves the control lever 265 to the dot-dash position of Fig. 10. This moves four arms 268, 269, 270 and 271 and conditions the mechanism for causing continuous machine cycles by rocking yoke 274 to move the devices that hold the motor bar down, releases arm 304 to enable stud 308 to engage the periphery of the control disk 309, and enables the pawl 319 and the detent 325. The machine then continues to cycle until the notch 311 comes opposite stud 308, whereupon the machine is automatically stopped. The operator subsequently moves the control lever 265 back to its full line position of Fig. 10, as will be presently explained, which holds the cycling mechanism against operation, disables the arm 304 with its stud 308, and disables the pawl 319 and detent 325. This frees the gear 322 which returns to its home position under the urge of its spring 341, and, through its engagement with the toothed lug 323, also returns the disk 309 and the indicator 337 to the set position which it occupied at the start of the last series of operations so that a new series of operations involving the same number of payments can be performed without manually resetting the indicator 337, or the indicator may be set manually for a series of any required number of payments.

The operator can stop the machine at any time while it is cycling by moving the control lever 265 back to its full line position (Fig. 10) which normalizes the parts.

From the description thus far given it will be clear that the machine can be caused to go through a predetermined number of cycles of operation; that the carriage will tabulate from No. 1, to No. 2, to No. 3 columns and then be returned to No. 1 position, the platen being line spaced at the end of the machine operation in column No. 3.

It remains to describe how the various figures are printed in the different columns.

Automatic controls

As previously stated the amount of the contract, $140.00, is entered on the amount keys by the operator as the first operation with the carriage in its No. 3 columnar position and the machine is given a cycle of operation to print this amount in column 3 as indicated in Fig. 14. This amount is added into the add-subtract register 150, said register being normally in condition for addition with the carriage in column 3. The add register 151 is non-added in this No. 3 column. For this purpose, the carriage is provided with a control roll 354 (Fig. 7) which engages the end of a lever 355. This lever is connected by a link 356 to one end of another lever 357 having a stud 358 engaging a projection on the lever 248 and moves the latter, with the result that pawl 172 is disabled from acting on stud 167 and register 151 remains out of engagement with the actuators during the entire machine cycle in this columnar position and for this operation.

After the carriage returns to its No. 1 column, the platen having been line spaced, the amount of the periodic payments, $12.00, is entered on the amount keys and the machine given a cycle of operation during which the item is printed as shown in Fig. 14. During this cycle of operation in this column the add-subtract register is in subtract condition. This is brought about by a roll 199 (Fig. 11) on the carriage which engages the lever 198 which in turn controls the subtraction lever 183 as previously described. The amount ($12.00) that was indexed on the amount keys is subtracted from the add-subtract register leaving it with $128.00 in it, and is added into the add register 151 which is normally in add condition leaving it with $12.00 in it. At the end of the cycle the carriage tabulates into column 2.

With the carriage in its No. 2 columnar position the indicator 337 (Fig. 8) is set, the control lever 265 (Fig. 10) is moved to active position, and the motor bar is depressed to initiate a series of machine cycles. No amount keys are depressed in this column or in any subsequent columns during the automatic series of operations. The add register is non-added in this column by a suitable carriage roll such as 354. Late in the cycle of operation initiated with the carriage in column No. 2, the carriage is moved to column No. 3 after which the machine performs another cycle of operation.

In column No. 3 it is now desired to print the balance due, i. e., $128.00, which is the amount in the add-subtract register. However, it is not desired that the add-subtract register be cleared. This requires a subtotal operation. But, as previously explained, the add-subtract register is normally in add condition in column No. 3. The proper control is brought about as follows:

Referring to Fig. 6, a link 359 is mounted on stud 360, the upper end of said link being connected to one end of a carriage control lever 361 pivoted at 129, said lever being adapted to be engaged by a roll, such as the roll 361a, when the carriage is in its No. 3 column. Mounted on the lower end of link 359 is a short slide 362 yieldingly connected to link 359 by spring 363. The short slide 362 has lateral lug 364 over which, under certain conditions, is positioned a lug 365 on the end of a slide 366 connected to the upper end of lever 265. When the control lever 265 is in the full line position of Fig. 10, the lever 285 is in the position of Fig. 6, and slide 366 blocks the slide 362 against movement. However, when control lever 265 is moved to active position, the lever 285 is rocked counterclockwise, and slide 366 is moved to release the slide 362. From this it will be seen that, even though a carriage control roll engages carriage control lever 361 in the No. 3, or any other column, the slide 362 will not be moved unless the control lever 265 is moved to active position.

Slide 362 is connected (Fig. 7) to one end of a lever 367 which has a stud and slot connection with a lever 368 pivoted at 170c and carrying a stud 369. When slide 362 is raised, stud 369 is positioned so as to interfere with the pass-by pawl 172c so that, at the beginning of the cycle, it does not act on the stud 168c and the add-subtract register is not disengaged from the actuators.

In order to take a subtotal it is, of course, necessary to release the zero stops to permit the actuators to move to differential positions under control of the register pinions. For this purpose, a lever 371 (Fig. 2) is provided and pivoted at 372. The rear end of this lever has a lateral lug 373 overlying the lever 367. When the latter is raised by the carriage roll, as heretofore described, the lever 371 is rocked clockwise. The forward end of the lever 371 overlies a stud 374 on a slide 375 whose lower end engages over the arm 225 (Fig. 9). When arm 225 is rocked clockwise, the slide 12 is moved to release the zero stops.

Thus, with a control roll active in column No. 3, after the control lever 265 has been placed in active position, the add-subtract register 150 will be conditioned for a subtotal. Both the conditioning of the machine and the taking of the subtotal take place automatically. The amount of the subtotal ($128.00) will be printed as indicated in Fig. 10. The add register 151 is non-added by the roll 354 in this column, as it was when the amount of $140.00 was entered.

The platen is line spaced during the latter part of the cycle in column No. 3 and the carriage returns to the No. 1 column where the machine is given another cycle of operation. In this column it is desired that the amount of the periodic payment, $12.00, be printed again and that this amount be subtracted from the add-subtract register. The add-subtract register 150 is conditioned for subtraction by the roll 199 as before. However, when the carriage was previously in the No. 1 column, the amount of $12.00 was indexed on the keys, and the add register was in add condition. With the carriage in the No. 1 column a second time, no keys are indexed. The add register 151 contains $12.00 and the add-subtract register or crossfooter 150 contains $128.00.

It is desired to print $12.00 and subtract it from the add-subtract register 150. This is done by taking a subtotal from the add register 151 and subtracting it from the add-subtract register 150. Referring to Fig. 6, a carriage control lever 376 is pivoted at 129 and a carriage roll is positioned to engage the lever when the carriage is in its No. 1 columnar position. This lever is connected to a link 377 that has a short slide 378 connected to its lower end, the slide being urged upward on the link by a spring 379. As shown in Fig. 7, the slide 378 is connected to a lever 380 pivoted at 381. This lever is, in turn, connected to a bell crank 382 pivoted at 170. The lower arm of the bell crank carries a stud 383 adapted to interfere with the action of the pass-by pawl 172. The arrangement is such that when the carriage controlled lever 376 is rocked by a roll on the carriage, and the link 377 with its slide 378 pulled upward, the lever 380 and bell crank 382 are rocked to a position such that the pass-by pawl 172 is disabled and the add register 151 is left in engagement with the actuators during the entire cycle so that a sub-total is taken from it. The lever 380 also underlies the lever 371 shown in Fig. 2 so that the zero stops are released as previously explained.

Except when the lever 265 is in its active position, the slide 378 is blocked against movement by the lug 365 on slide 366 (Fig. 6) in the same manner as the slide 362 previously explained. Thus, when the carriage is first in the No. 1 column at the time the item of $12.00 is indexed on the keys, the add register 151 is in add condition because the slide 378 is blocked against being moved by a carriage roll which, therefore, merely tensions the spring 379. However, when the control lever 265 (Fig. 10) is moved to active position (first operation in column No. 2), the slide 366 is moved to release the slide 375 (Fig. 2), so that the second time the carriage reaches its No. 1 column a subtotal is taken from the add register 151. This subtotal is printed, and it is subtracted from the add-subtract register, the latter having been placed in subtraction position as previously explained. The conditioning of the machine for subtotal taking and the taking of the subtotal are both automatic.

Near the end of the operation in the No. 1 column the carriage again moves to column No. 2. The add register is non-added in this column as previously explained. During the machine cycle in column No. 2 the add-subtract register 150 is changed from subtract back to add condition. In column No. 3, the add register 151 is non-added and the add-subtract register 150 is subtotaled as previously explained, after which the carriage returns to its No. 1 position, the platen being line spaced in the meantime.

These operations are repeated a number of times depending upon how the indicator 337 is set. In the example shown, the contract of $140.00 with payments of $12.00 per month, involves eleven payments, with a remainder of $8.00. The control lever 265 is not moved to active position until after the cycle of operation in which the first payment of $12.00 is entered into the add register 151 and the last payment of $8.00 is an odd amount which means that the series of automatic operations should continue until the platen has been line-spaced ten times. The indicator 337 is set at "12" but the parts are proportioned so that these series of automatic operations will stop after the tenth line-spacing of the platen. Improper cycling of the machine during return movements of the carriage are prevented by the interlock shown in Figs. 4, 4ª and 6 which prevents cycling of the machine until the carriage reaches its "column 1" position. Devices of this kind are old and the one employed on this machine has been in public use for a number of years.

After the tenth line-spacing of the platen, that is, after the cycle in which the sub-total 20.00 is printed in column 3, the carriage returns to column 1 and the machine stops. This informs the operator that the series of entries has been completed. He then depresses the add register total key 217 and the motor bar, which clears the add-register instead of subtotaling it. The amount, $12.00, in the register is printed (Fig. 14) and subtracted from the add-subtract register, leaving $8.00 in the latter. The carriage moves to the No. 2 column near the end of this cycle. The operator depresses the motor bar a second time which causes a cycle of the machine during which the add-subtract register is changed back to add condition. The add register is non-added in this column. Near the end of the cycle the carriage moves to column No. 3.

The operator then depresses the add-subtract register sub-total key 250, which causes a cycle of operation during which the add-subtract register is sub-totaled, the amount of the sub-total, $8.00, being printed as shown in Fig. 14. During the latter part of the cycle, the carriage moves to the No. 1 column again, the platen being line spaced. The operator then depresses the total key 201 for the add-subtract register, which causes a cycle of operation during which the add-subtract register is cleared and the amount of the total, $8.00, printed (Fig. 14) the add register 151 being non-added by the depression of the total key 201, as previously described. The carriage moves to the No. 2 column during the latter part of this cycle. Although the carriage control roll depresses the subtract lever for the add-subtract register during this cycle, the total key 201 disables the subtraction control through the element 203—205 as previously described.

Both the registers are now clear. The add-subtract register total key 201 is again depressed and the machine operated, whereupon two ciphers (.00) are printed (Fig. 14) to show that the register is clear. It also indicates on the sheet that the account is closed and all payments made. The two ciphers are printed by having the total character sector of the special character printing mechanism arranged so that it operates the printing latches in the first two digit columns.

During the hand operations above mentioned the control lever 265 remains in active position, but the automatic cycling mechanism is not reconditioned by depression of the motor bar because the slot 311 in disk 309 is of sufficient width to permit these hand operations while stud 308 is in said slot.

After the operation in No. 2 column showing that the add-subtract register is clear, the carriage moves to its No. 3 column where it is ready to have the sheet removed. The operator then returns the control lever 265 to inactive position, inserts a new sheet, and proceeds as before.

I claim:

1. A calculating machine of the class described, having means for giving said machine cycles of operation, registering mechanism, differential actuator mechanism, function control means for controlling co-operation of said registering and differential actuator mechanisms for calculating operations, control means operated automatically in cycles of machine operation to vary the condition of said function control means, settable means having a normal ineffective condition and settable to a plurality of effective conditions, and means, conditioned by said settable means when set to its different effective conditions, to condition said automatically operated control means to cause said function control means to be conditioned, for machine cycles of a predetermined class, for a predetermined function, other than a function for which it is normally conditioned for machine cycles of said predetermined class, means operable automatically to disable said settable means after different numbers of machine cycles in accordance with the different effective settings of said settable means.

2. A calculating machine of the class described, having a power operated driving means, control means normally operable to cause said driving means to give the machine single cycles of operation, variably settable means for rendering said control means effective to cause said driving means to give the machine a number of automatic cycles of operation in accordance with the different settings of said settable means, registering mechanism, differential actuator mechanism, function control means for controlling cooperation of said registering and differential actuator mechanism for calculating operations, columnar printing control means, means controlled automatically by said columnar printing control means to vary the condition of said function control means, and means, conditioned by said settable means when set, to condition said automatically controlled means to cause said function control means to be conditioned, with said columnar printing control means in a predetermined columnar condition, for a predetermined function other than a function for which it is normally conditioned with said columnar printing control means in the same predetermined columnar condition.

3. A calculating machine of the class described, having a power operated driving means, control means normally operable to cause said driving means to give the machine single cycles of operation, variably settable means for rendering said control means effective to cause said driving means to give the machine different numbers of automatic cycles of operation corresponding to the different settings of said settable means, registering mechanism, differential actuator mechanism, function control means for controlling co-operation of said registering and differential actuator mechanisms for calculating operations, a paper carriage movable to a plurality of columnar positions, carriage tabulating means operable automatically during cycles of machine operation to move said carriage in one direction to new columnar positions, carriage return means for automatically returning said carriage in the opposite direction across the machine, carriage controlled means to vary the condition of said function control means, and means, conditioned by said settable means when set, to condition said carriage controlled means to cause said function control means to be conditioned, with said carriage in a predetermined columnar position during said automatic machine cycles, for a predetermined function other than a function for which said function control means is normally conditioned when the carriage occupies the same predetermined position.

4. A calculating machine of the class described, having a power operated driving means, control means normally operable to cause said driving means to give the machine single cycles of operation, variably settable means having a normal condition and a plurality of different set conditions for rendering said control means effective for causing said driving means to give the machine different numbers of automatic cycles of operation corresponding to the different set conditions of said settable means, means operated automatically in said automatic cycles of machine operation to return said settable means step by step toward normal condition, registering mechanism, differential actuator mechanism, function control means for controlling co-operation of said registering and differential actuator mechanisms for calculating operations, a paper carriage movable to a plurality of columnar positions, carriage tabulating means operable automatically during cycles of operation of the machine to move said carriage in one direction to new columnar positions, carriage return means for automatically returning said carriage in the opposite direction across the machine, carriage controlled means to vary the condition of said function control means, and means, conditioned by said settable means when set, to condition said carriage controlled means to cause said function control means to be conditioned, when said carriage is in a predetermined columnar position during said automatic machine cycles, for a predetermined function other than a function for which said function control means is conditioned when the carriage occupies the same predetermined position while said settable means is in normal condition.

5. A calculating machine of the class described, having a power operated driving means, control means normally operable to cause said driving means to give the machine single cycles of operation, variably settable means, normally disabled elements for rendering said control means effective to cause said driving means to give the machine automatic cycles of operation, and elements, operable by said settable means when set, to enable said normally disabled elements for predetermined numbers of machine cycles corresponding to the different settings of said variably settable means, registering mechanism, differential actuator mechanism, function control means for controlling co-operation of said registering and differential mechanisms for calculating operations, a paper carriage movable to a plurality of columnar positions, carriage tabulating means operable automatically during cycles of machine operation to move said carriage in one direction to new columnar positions, carriage return means for automatically returning said carriage in the opposite direction across the machine, carriage controlled means to vary the condition of said function control means, and means conditioned by operation of said enabling elements to condition said carriage controlled means to cause said function control means to be conditioned, when said carriage is in a predetermined columnar position during said automatic machine cycles, for a predetermined function other than a function for which said function control means is normally conditioned when the carriage occupies the same predetermined position.

6. A calculating machine of the class described, having a power operated driving means, control means normally operable to cause said driving means to give the machine single cycles of operation, normally ineffective means settable to a plurality of effective conditions for rendering said control means effective to cause said driving means to give the machine different numbers of automatic cycles of operation in accordance with the different effective settings of said settable means, registering mechanism, differential actuator mechanism, function control means for controlling co-operation of said registering and differential actuator mechanisms for calculating operations, a paper carriage movable to a plurality of columnar positions, carriage tabulating means operable automatically during cycles of machine operation to move said carriage in one direction to new columnar positions, carriage return means for automatically returning said carriage in the opposite direction across the machine, carriage controlled means to vary the condition of said function control means, means, conditioned by said settable means when set, to condition said carriage controlled means to cause said function control means to be conditioned, when said carriage is in a predetermined columnar position during said automatic machine cycles, for a predetermined function other than a function for which said function control means is normally conditioned when the carriage occupies the same predetermined position, a platen on said carriage, a line-spacing means, means operated automatically during cycles of machine operation to operate said line-spacing means to line-space said platen, and means operated by said last-named operating means under the control of said settable means when set to an effective position to place said settable means in ineffective condition upon completion of the number of automatic cycles of machine operation determined by the effective setting of said settable means.

ARTHUR J. FETTIG.